United States Patent
Qian et al.

(10) Patent No.: US 11,397,915 B2
(45) Date of Patent: Jul. 26, 2022

(54) EX-WAREHOUSING METHOD AND DEVICE

(71) Applicant: Hangzhou Hikrobot Technology Co., Ltd, Zhejiang (CN)

(72) Inventors: Yangwei Qian, Zhejiang (CN); Xiangliang Kong, Zhejiang (CN); Keping Zhu, Zhejiang (CN)

(73) Assignee: Hangzhou Hikrobot Technology Co., Ltd., Zhejiang (CN)

( * ) Notice: Subject to any disclaimer, the term of this patent is extended or adjusted under 35 U.S.C. 154(b) by 164 days.

(21) Appl. No.: 16/464,549

(22) PCT Filed: Aug. 11, 2017

(86) PCT No.: PCT/CN2017/097175
§ 371 (c)(1),
(2) Date: May 28, 2019

(87) PCT Pub. No.: WO2018/099134
PCT Pub. Date: Jun. 7, 2018

(65) Prior Publication Data
US 2021/0110333 A1    Apr. 15, 2021

(30) Foreign Application Priority Data
Nov. 29, 2016  (CN) .......................... 201611077037.X

(51) Int. Cl.
*G06Q 10/08* (2012.01)
*G06Q 50/28* (2012.01)

(52) U.S. Cl.
CPC .......... *G06Q 10/087* (2013.01); *G06Q 50/28* (2013.01)

(58) Field of Classification Search
CPC .............................. G06Q 10/087; G06Q 50/28
(Continued)

(56) References Cited

U.S. PATENT DOCUMENTS

2004/0122749 A1    6/2004  Wei
2009/0063035 A1    3/2009  Mandel et al.
(Continued)

FOREIGN PATENT DOCUMENTS

CN    102541866 A       7/2012
CN    102760256 A   *  10/2012
(Continued)

OTHER PUBLICATIONS

Extended Search Report of corresponding European Application No. 17876773.7 issued by the EPO dated Jul. 30, 2019.
(Continued)

*Primary Examiner* — Luna Champagne
(74) *Attorney, Agent, or Firm* — Meunier Carlin & Curfman LLC

(57) ABSTRACT

An ex-warehousing method and device relate to an automated logistics technology, and efficiently improve the ex-warehousing efficiency. The ex-warehousing method includes: receiving an order for to-be-ex-warehoused goods during an ex-warehousing process (101); incorporating the order for to-be-ex-warehoused goods with an order for goods currently being ex-warehoused to obtain a incorporated order (102); acquiring, based on each of warehoused goods properties in the incorporated order, goods shelf information matching each of the warehoused goods properties, respectively (103); matching acquired goods shelf information based on a preset goods shelf information ex-warehousing strategy, to obtain a target goods shelf information (104). The ex-warehousing method is suitable for optimizing the ex-warehousing and inventory.

15 Claims, 3 Drawing Sheets

(58) Field of Classification Search
USPC .......................................................... 705/28
See application file for complete search history.

(56) References Cited

U.S. PATENT DOCUMENTS

| | | |
|---|---|---|
| 2012/0330458 A1 | 12/2012 | Weiss |
| 2013/0297461 A1 | 11/2013 | Wong et al. |
| 2013/0317642 A1 | 11/2013 | Asaria et al. |

FOREIGN PATENT DOCUMENTS

| | | | |
|---|---|---|---|
| CN | 103473658 A | | 12/2013 |
| CN | 104881768 A | | 9/2015 |
| CN | 105117892 A | | 12/2015 |
| CN | 105303352 A | | 2/2016 |
| CN | 105427065 A | * | 3/2016 |
| CN | 105427065 A | | 3/2016 |
| CN | 106005866 A | | 10/2016 |
| CN | 106185152 A | * | 12/2016 |
| CN | 106203928 A | * | 12/2016 |
| JP | 2005104732 A | | 4/2005 |
| JP | 2008105795 A | | 5/2008 |
| JP | 2009541174 A | | 11/2009 |
| JP | 2015506324 A | | 3/2015 |
| WO | WO-2017149705 A1 * | 9/2017 | ....... G06Q 10/06398 |

OTHER PUBLICATIONS

First Office Action of corresponding Japanese Application No. 2019-548507, dated Oct. 6, 2020.
Second Office Action of corresponding Japanese Application No. 2019-548507, dated Jul. 6, 2021.

* cited by examiner

EX-WAREHOUSING METHOD AND DEVICE

The present application claims the priority to a Chinese Patent Application No. 201611077037.X, filed with the China National Intellectual Property Administration on Nov. 29, 2016 and entitled "Ex-Warehousing Method And Device", which is incorporated into the present application by reference in its entirety.

TECHNICAL FIELD

The present application relates to an automated logistics technology, and more particularly to an ex-warehousing method and device.

BACKGROUND

Warehousing management is an effective control of activities of receiving, sending, and balancing warehoused goods. Through the classification and recording, and the path planning of ex-warehousing of the warehoused goods, it can ensure the normal and efficient operation of production and business activities.

With the rapid development of the logistics industry, in order to effectively improve the efficiency of warehousing, the requirements for an automation warehousing management is increasing. In a process of an ex-warehousing operation, it is necessary to determine whether there are orders that can be incorporated in multiple orders of the ex-warehousing operation based on the properties of goods in the orders, and incorporate the orders that need to be incorporated. Then, based on the incorporated orders, the moving distance from each of goods to be ex-warehoused in the incorporated order to the operation platform is calculated, and the goods are ex-warehoused based on the minimum moving distance. After the ex-warehousing of goods for the incorporated orders is completed, orders received during and after the ex-warehousing of goods are processed.

In the ex-warehousing method, the orders are incorporated before the ex-warehousing of goods, and then, based on the incorporated order, the goods are ex-warehoused in the minimum moving distance. During the ex-warehousing of goods, the newly received orders are no longer considered. However, in the newly received orders, there may be some of the warehoused goods located in goods shelf information for goods being ex-warehoused, such that the number of times of ex-warehousing is increased, the total time of processing is extended and thus the ex-warehousing efficiency is reduced.

SUMMARY

In view of this, embodiments of the present application provide an ex-warehousing method and apparatus, which can improve the ex-warehousing efficiency and solve the problems of the increased number of times of ex-warehousing, the extended total time of processing and thus the reduced ex-warehousing efficiency, due to the new orders are not processed during the ex-warehousing of goods, in the existing ex-warehousing method.

In a first aspect, an embodiment of the present application provides an ex-warehousing method, including:
receiving an order for to-be-ex-warehoused goods during an ex-warehousing process;
incorporating the order for to-be-ex-warehoused goods with an order for goods currently being ex-warehoused to obtain an incorporated order;
acquiring, based on properties of warehoused goods in the incorporated order, goods shelf information matching with the properties of the warehoused goods respectively; and
obtaining target goods shelf information according to the matched goods shelf information acquired based on a preset goods shelf information ex-warehousing strategy.

Combining with the first aspect, in a first implementation of the first aspect, obtaining target goods shelf information according to the matched goods shelf information acquired based on a preset goods shelf information ex-warehousing strategy includes:
determining whether there is a goods shelf being ex-warehoused, and if yes, determining the goods shelf information corresponding to the goods shelf being ex-warehoused as the target goods shelf information.

Combining with the first aspect, in a second implementation of the first aspect, obtaining target goods shelf information according to the matched goods shelf information acquired based on a preset goods shelf information ex-warehousing strategy includes:
determining whether there is a goods shelf being ex-warehoused, if no, and if the acquired goods shelf information comprises batch numbers, sorting the acquired pieces of goods shelf information comprising batch numbers by the batch numbers in an order of first-in-first-out, and selecting sequentially the pieces of goods shelf information sorted by the batch numbers as the target goods shelf information.

Combining with the second implement of the first aspect, in a third implementation of the first aspect, the method further includes:
if the acquired goods shelf information does not comprises a batch number, sorting the acquired pieces of goods shelf information that do not comprises a batch number by warehousing dates in an order of first-in-first-out, and selecting sequentially the pieces of goods shelf information sorted by the warehousing dates as the target goods shelf information.

Combining with the third implement of the first aspect, in a fourth implementation of the first aspect, the method further includes:
if there are multiple pieces of goods shelf information for a warehousing date, sorting the multiple pieces of the goods shelf information with the earlier warehousing date by total inventory of the goods shelf information in order of large to small, and selecting sequentially the pieces of goods shelf information sorted by the total inventory as the target goods shelf information.

Combining with the second implement of the first aspect, in a fifth implementation of the first aspect, the method further includes:
if there are multiple pieces of goods shelf information for a batch number, sorting the multiple pieces of the goods shelf information with the batch number by total inventory of the goods shelf information in an order of large to small, and selecting sequentially the pieces of goods shelf information sorted by the total inventory as the target goods shelf information.

Combining with the fourth or fifth implement of the first aspect, in a sixth implementation of the first aspect, the method further includes:
if there are multiple pieces of goods shelf information each of which has the same total inventory in the sorting by the total inventory, sorting the multiple pieces of goods shelf information by inventory of the goods shelf information in each of directions in order of large to small, and selecting sequentially the pieces of goods shelf information sorted by the inventory in the directions as the target goods shelf information.

Combining with the sixth implement of the first aspect, in a seventh implementation of the first aspect, the method further includes:

if there are multiple pieces of goods shelf information with the same total inventory in different directions in the sorting by directions, calculating distances between each of goods shelves corresponding to the multiple pieces of goods shelf information with the same total inventory in different directions and a operation platform, sorting the multiple pieces of goods shelf information by the distances in an order of near to far, and selecting sequentially the pieces of goods shelf information sorted by the distances as the target goods shelf information.

Combining with the first aspect and any one of the first to fifth implementations of the first aspect, in an eighth implementation of the first aspect, after obtaining the target goods shelf information, the method further includes:

instructing an automated guided vehicle to transport the target goods shelf corresponding to the target shelf information to a operation platform based on the target goods shelf information.

Combining with the eighth implement of the first aspect, in a ninth implementation of the first aspect, the method further includes:

in an order of small to large for the total inventory at each of storage locations in the target goods shelf information, instructing to preferably select warehoused goods in a storage location with a small total inventory at a storage location to be ex-warehoused.

Combining with the ninth implement of the first aspect, in a tenth implementation of the first aspect, the method further includes:

if there are multiple storage locations with the same total inventory, arranging, in an order of high to low for positions of storage locations, instructing to preferably select warehoused goods at a storage location with a high position to be ex-warehoused.

Combining with the first aspect and any one of the first to fifth implementations of the first aspect, in an eleventh implementation of the first aspect, acquiring, based on properties of warehoused goods in the incorporated order, goods shelf information matching with the properties of the warehoused goods respectively includes:

classifying, based on whether a special inventory is comprised in the properties of the warehoused goods, all warehoused goods in the incorporated order into a special inventory list and a non-special inventory list;

classifying the special inventory list and the non-special inventory list secondarily, based on whether a batch number is comprised in the properties of the warehoused goods;

querying a preset inventory list to acquire goods shelf information to which each of the secondary-classified warehoused goods belongs, and incorporating the acquired goods shelf information.

In a second aspect, an embodiment of the present application provides an ex-warehousing apparatus including: an order incorporating module, a goods shelf information acquirement module and a goods shelf information selection module; wherein, the order incorporating module is configured for: during an ex-warehousing process, receiving an order for to-be-ex-warehoused goods and incorporating the order for to-be-ex-warehoused goods with an order for goods currently being ex-warehoused to obtain a incorporated order;

the goods shelf information acquirement module is configured for: based on each of warehoused goods properties in the incorporated order, goods shelf information matching each of the warehoused goods properties is acquired respectively;

the goods shelf information selection module is configured for: matching acquired goods shelf information based on a preset goods shelf information ex-warehousing strategy, to obtain a target goods shelf information.

Combining with the second aspect, in a first implementation of the second aspect, the goods shelf information selection module includes: a first determination unit; wherein, the first determination unit is configured for: determining whether there is goods shelf information for goods being ex-warehoused, and if there is goods shelf information for goods being ex-warehoused, determining the goods shelf information for goods being ex-warehoused as the target goods shelf information.

Combining with the second aspect, in a second implementation of the second aspect, the goods shelf information selection module includes: a third determination unit, a second determination unit and a batch number sorting unit; wherein, the third determination unit is configured for determining whether there is goods shelf information for goods being ex-warehoused, and if no, notifying the second determination unit;

the second determination unit is configured for determining whether the acquired goods shelf information comprises batch numbers, and if yes, notifying the batch number sorting unit;

the batch number sorting unit is configured for sorting the acquired pieces of goods shelf information comprising batch numbers by the batch numbers in an order of first-in-first-out, and selecting sequentially the pieces of goods shelf information sorted by the batch numbers as the target goods shelf information.

Combining with the second implementation of the second aspect, in a third implementation of the second aspect, the goods shelf information selection module further includes: a date sorting unit; wherein, the second determination unit is further configured for, if the acquired goods shelf information does not comprises a batch number, notifying the date sorting unit;

the date sorting unit is configured for sorting the acquired pieces of goods shelf information that do not comprises a batch number by warehousing dates in an order of first-in-first-out, and selecting sequentially the pieces of goods shelf information sorted by the warehousing dates as the target goods shelf information.

Combining with the third implementation of the second aspect, in a fourth implementation of the second aspect, the date sorting unit is further configured for:

if there are multiple pieces of goods shelf information for a warehousing date, sorting the multiple pieces of the goods shelf information with the warehousing date by total inventory of the goods shelf information in an order of large to small, and selecting sequentially the pieces of goods shelf information sorted by the total inventory as the target goods shelf information.

Combining with the second implementation of the second aspect, in a fifth implementation of the second aspect, the batch number sorting unit is further configured for:

if there are multiple pieces of goods shelf information for a batch number, sorting the multiple pieces of the goods shelf information with the batch number by total inventory of the goods shelf information in an order of large to small, and selecting sequentially the pieces of goods shelf information sorted by the total inventory as the target goods shelf information.

Combining with the fourth or fifth implementation of the second aspect, in a sixth implementation of the second aspect, the batch number sorting unit is further configured for:

if there are multiple pieces of goods shelf information each of which has the same total inventory in the sorting by the total inventory, sorting the multiple pieces of goods shelf information by inventory of the goods shelf information in each of directions in order of large to small, and selecting sequentially the pieces of goods shelf information sorted by the inventory in the directions as the target goods shelf information.

Combining with the sixth implementation of the second aspect, in a seventh implementation of the second aspect, the batch number sorting unit is further configured for:

if there are multiple pieces of goods shelf information with the same total inventory in different directions in the sorting by directions, calculating distances between each of the multiple pieces of goods shelf information with the same total inventory in different directions and a operation platform, sorting the multiple pieces of goods shelf information by the distances in an order of near to far, and selecting sequentially the pieces of goods shelf information sorted by the distances as the target goods shelf information.

Combining with the second aspect and any one of the first to fifth implementations of the second aspect, in an eighth implementation of the second aspect, the apparatus further includes:

an instructing module, configured for instructing an automated guided vehicle to transport the target goods shelf corresponding to the target shelf information to a operation platform based on the target goods shelf information.

Combining with the eighth implementation of the second aspect, in a ninth implementation of the second aspect, the apparatus further includes:

an ex-warehousing module, configured for, in an order of small to large for the total inventory at each of storage locations in the target goods shelf information, instructing to preferably select warehoused goods in a storage location with a small total inventory at a storage location to be ex-warehoused.

Combining with the ninth implementation of the second aspect, in a tenth implementation of the second aspect, the ex-warehousing module is further configured for, if there are multiple storage locations with the same total inventory, arranging, in an order of high to low for positions of storage locations, instructing to preferably select warehoused goods at a storage location with a high position to be ex-warehoused.

Combining with the second aspect and any one of the first to fifth implementations of the second aspect, in an eleventh implementation of the second aspect, the goods shelf information acquirement module includes: a first classifying unit, a second classifying unit and a goods shelf information acquirement unit; wherein, the first classifying unit is configured for classifying, based on whether a special inventory is comprised in the properties of the warehoused goods, all warehoused goods in the incorporated order into a special inventory list and a non-special inventory list;

the second classifying unit is configured for classifying the special inventory list and the non-special inventory list secondarily, based on whether a batch number is comprised in the properties of the warehoused goods;

the goods shelf information acquirement unit is configured for querying a preset inventory list to acquire goods shelf information to which each of the secondary-classified warehoused goods belongs, and incorporating the acquired goods shelf information.

In a third aspect, an embodiment of the present application provides an electronic device. The electronic device includes: a housing, a processor, a memory, a circuit board, and a power circuit; wherein the circuit board is arranged inside space surrounded by the housing; the processor and the memory are arranged on the circuit board; the power circuit is configured for supplying power to each of circuits or components of the electronic device; the memory is configured for storing executable program codes; the processor is configured for implementing any one of the above-described ex-warehousing methods by reading the executable program codes stored in the memory to execute the program corresponding to the executable program codes.

In a fourth aspect, an electronic device is provided, including: a processor and a memory; wherein, the memory is configured for storing executable program code, and the processor is configured for implementing any one of the above-described ex-warehousing methods by reading the executable program code stored in the memory to execute a program corresponding to the executable program code.

In a fifth aspect, an embodiment of the present application discloses an executable program code, and the executable program code is configured for: when being executed, implementing any one of the above-described ex-warehousing methods.

In a sixth aspect, an embodiment of the present application discloses a computer readable storage medium for storing executable program code; and the executable program code is configured for: when being executed, implementing any one of the above-described ex-warehousing methods.

Embodiments of the present application provide an ex-warehoused method, apparatus and electronic device. An order for to-be-ex-warehoused goods is received during an ex-warehousing process, the order for to-be-ex-warehoused goods is incorporated with an order for goods currently being ex-warehoused to obtain a incorporated order, based on each of warehoused goods properties in the incorporated order, goods shelf information matching each of the warehoused goods properties is acquired respectively; and acquired goods shelf information is matched based on a preset goods shelf information ex-warehousing strategy, to obtain a target goods shelf information. The ex-warehousing efficiency can be improved, to solve the problems of the increased number of times of ex-warehousing, the extended total time of processing and thus the reduced ex-warehousing efficiency, due to the new orders are not processed during the ex-warehousing of goods, in the existing ex-warehousing method.

BRIEF DESCRIPTION OF THE DRAWINGS

In order to more clearly describe the technical solutions of the embodiments of the present application and the prior art, accompanying drawings that need to be used in embodiments and the prior art will be briefly described below. Obviously, accompanying drawings described below are for only some of embodiments of the present application; those skilled in the art may also obtain other accompanying drawings based on these accompanying drawings without any creative efforts.

DETAILED DESCRIPTION

In order to make the objectives, technical solutions, and advantages of the present application clearer and more understandable, the present application will be described in more detail below with reference to the appended drawings and embodiments. Obviously, the described embodiments are only some, and not all, of the embodiments of the present application. All other embodiments obtained based on the embodiments of the present application by those skilled in the art without any creative efforts fall into the scope of protection of the present application.

Figure 1:
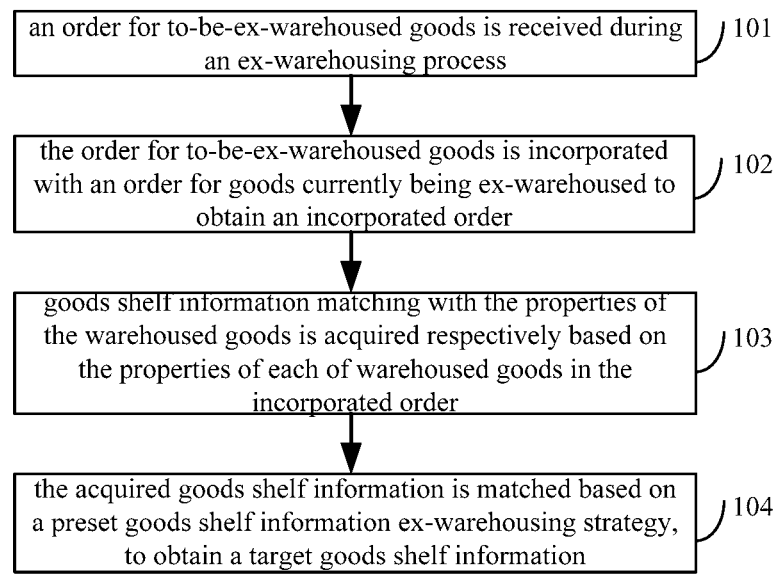
FIG. 1 is a schematic flowchart of an ex-warehousing method according to a first embodiment of the present application.

FIG. 1 is a schematic flowchart of an ex-warehousing method according to a first embodiment of the present application. As shown in FIG. 1, the method in this embodiment may include the following steps.

In step 101, an order for to-be-ex-warehoused goods is received during an ex-warehousing process.

In step 102, the order for to-be-ex-warehoused goods is incorporated with an order for goods currently being ex-warehoused to obtain an incorporated order.

In this embodiment, as an optional embodiment, receiving an order for to-be-ex-warehoused goods and incorporating the order for to-be-ex-warehoused goods with an order for goods currently being ex-warehoused to obtain an incorporated order includes:

traversing the properties of the warehoused goods in the order for to-be-ex-warehoused goods, and determining whether there are goods in the order for goods currently being ex-warehoused with the same properties as that of the traversed warehoused goods; if yes, updating, based on the number in an order columns corresponding to the properties of the traversed warehoused goods, the number in an order columns corresponding to the same properties of the warehoused goods in the order for goods currently being ex-warehoused; if no, adding the order columns corresponding to the properties of the traversed warehoused goods to the order for goods currently being ex-warehoused.

In this embodiment, as an optional embodiment, the properties of a warehoused good include, but are not limited to: a name of good, a specification, a batch number, a factory, a storage location, a special inventory, and the like. The properties of a warehoused good do include the number of good. If the name of good, the specification, the batch number, the factory, storage location and the special inventory of a certain one of the warehoused goods are respectively the same as those of a warehoused good in an inventory list, it can be determined that the properties of that warehoused good match with the inventory list.

In this embodiment, if properties of a warehoused good in the order for to-be-ex-warehoused goods are the same as those of a warehoused good in the order for goods currently being ex-warehoused, that warehoused good in the order for to-be-ex-warehoused goods is incorporated into the order for goods currently being ex-warehoused so as to effectively reduce the number of times of ex-warehousing and the total time of processing.

In this embodiment, it may also per-process the order for to-be-ex-warehoused goods, that is, determine whether there are warehoused goods in the order for to-be-ex-warehoused goods in inventory. Thus, in another optional embodiment, receiving an order for to-be-ex-warehoused goods and incorporating the order for to-be-ex-warehoused goods with an order for goods currently being ex-warehoused to obtain an incorporated order includes:

A11, traversing the properties of the warehoused goods in the order for to-be-ex-warehoused goods, and matching respectively the properties of the warehoused goods in the order for to-be-ex-warehoused goods with the inventory list; if the matching is successful, writing order columns corresponding to the properties of the matched warehoused goods into the order for goods currently being ex-warehoused;

A12, determining, in the order for goods currently being ex-warehoused into which the properties of the matched warehoused goods are written, whether there is a good whose properties are the same as that of a matched warehoused good; if yes, updating, based on the number in order columns corresponding to the properties of the matched warehoused goods, the number in order columns corresponding to the properties of the same warehoused goods in the order for goods currently being ex-warehoused, and deleting the written order columns corresponding to the properties of the warehoused goods.

In step 103, goods shelf information matching with the properties of the warehoused goods is acquired respectively based on the properties of each of warehoused goods in the incorporated order.

In this embodiment, as an optional embodiment, for an incorporated order that has not been matched with the inventory list, acquiring goods shelf information matching with the properties of the warehoused goods respectively based on the properties of each of warehoused goods in the incorporated order includes:

A21, classifying all warehoused goods in the incorporated order into a special inventory list and a non-special inventory list based on whether the properties of the warehoused goods include a special inventory.

In this embodiment, warehoused goods with special requirements, such as, warehoused goods with requirements for preset special materials, special manufacturers, special transportation measures, etc., are generally stored in a special warehouse so as to be isolated from the non-special inventory in which warehoused goods without special requirements are stored. Therefore, the warehoused goods in the incorporated order are classified into inventory lists based on whether the warehoused goods have special storing requirements.

A22, the special inventory list and the non-special inventory list are classified secondarily based on whether a batch number is included in properties of the warehoused goods.

A23, a preset inventory list is queried for acquiring goods shelf information of the secondary-classified warehoused goods, and the acquired goods shelf information is incorporated.

In this embodiment, as an optional embodiment, after acquiring the goods shelf information matching with the properties of the warehoused goods, the storage location information of the goods shelf information may further be acquired.

In step 104, the acquired goods shelf information is matched based on a preset goods shelf information ex-warehousing strategy, to obtain a target goods shelf information.

In this embodiment, as an optional embodiment, matching the acquired goods shelf information based on a preset goods shelf information ex-warehousing strategy includes:

if it is determined that there is a good being ex-warehoused, and determining goods shelf information for the good being ex-warehoused as target goods shelf information.

In this embodiment, the goods shelf being ex-warehoused is preferably transported to the operation platform.

In this embodiment, as another optional embodiment, matching the acquired goods shelf information based on a preset goods shelf information ex-warehousing strategy includes:

if it is determined that that there is no goods being ex-warehoused, and if goods shelf information includes a batch number, sorting the goods shelf information including a batch number by the batch numbers in an order of first-in-first-out, and selecting sequentially the goods shelf information sorted by the batch number as target goods shelf information.

In this embodiment, the goods shelf with goods for earlier batch numbers is preferably transported.

In this embodiment, as an optional embodiment, matching the acquired goods shelf information based on a preset goods shelf information ex-warehousing strategy includes:

if it is determined that that there is no goods being ex-warehoused, and if goods shelf information does not include a batch number, sorting the goods shelf information that does not include a batch number by warehousing date in an order of first-in-first-out, and selecting sequentially the goods shelf information sorted by the warehousing date as target goods shelf information.

In this embodiment, the good with an earlier warehousing date is preferably transported.

In this embodiment, for the goods shelf information sorted by a batch number in an order of first-in-first-out and the goods shelf information sorted by a warehousing date in an order of first-in-first-out, there may be multiple pieces of the goods shelf information with earlier batch number or earlier warehousing date. That is, the goods shelf information sorted by the batch number or the goods shelf information sorted by the warehousing date may include identical goods shelf information. Therefore, as an optional embodiment, before transporting to the operation platform, the method further includes:

if there are multiple pieces of goods shelf information with an earlier batch number or with an earlier warehousing date, sorting the multiple pieces of the goods shelf information with an earlier batch number or with an earlier warehousing date by total inventory of goods shelf information in an order of from large to small, and selecting sequentially goods shelf information sorted by the total inventory as the target goods shelf information.

In this embodiment, by sorting again the paratactic goods shelf information included in the goods shelf information sorted by the batch number or the goods shelf information sorted by the warehousing date, the goods shelf information with the large total inventory of goods shelf information is preferably transported, such that the number of the pieces of goods shelf information may be reduced, thus effectively reducing the number of times of transportation and transportation time.

In this embodiment, as another optional embodiment, the method further includes:

if there are multiple pieces of goods shelf information each of which has the same total inventory in the sorting by the total inventory, sorting the multiple pieces of goods shelf information by inventory direction in the goods shelf information in an order of ranging from large to small, and selecting sequentially goods shelf information sorted by the inventory direction as the target goods shelf information.

In this embodiment, for multiple pieces of goods shelf information, the goods shelf information with a direction directed to a large total inventory is preferably selected, thus implementing the principle of less rotation of the goods shelf.

In this embodiment, a goods shelf has four directions, that is, front, rear, left and right directions, and the warehoused goods may be ex-warehoused from any one or more of four directions. For example, if the number of the total inventory in the front direction of a goods shelf (that is, the warehouse goods that can be directly taken out from the direction) is 15, the number of the total inventory in the rear direction of the goods shelf is 8, the number of the total inventory in the left direction of the goods shelf is 6, and the number of the total inventory in the right direction of the goods shelf is 3; and the number of the total inventory in the front, rear, left and right directions of another goods shelf are respectively 8, the number of the goods shelf with the total inventory of the front direction of 15 is ranked first, which is preferably selected as the target goods shelf information.

In this embodiment, as further optional embodiment, the method further includes:

if there are multiple pieces of goods shelf information with the same total inventory in different directions in the sorting by direction, calculating the distance between each of the multiple pieces of goods shelf information with the same total inventory in the directions and the operation platform, sorting the multiple pieces of goods shelf information by distances in order of ranging from near to far, and selecting sequentially goods shelf information sorted by the distances as the target goods shelf information.

In this embodiment, as an optional embodiment, after transporting to a operation platform, the method further includes:

indicating position information and the number information of storage locations of the goods shelf information.

In this embodiment, as an optional embodiment, after obtaining the target goods shelf information, the method further includes:

instructing an automated guided vehicle (AGV) to transport the target goods shelf corresponding to the target shelf information to the operation platform based on the target goods shelf information.

In this embodiment, as another optional embodiment, after obtaining the target goods shelf information, the method further includes:

sorting the total inventory of each of storage locations in the target goods shelf information in an order of small to large, and instructing to preferably select warehoused goods in a storage location with a small total inventory of storage location to be ex-warehoused.

In this embodiment, after the target goods shelf information is transported to the operation platform, it is necessary for the relevant personnel to unload the goods from the target goods shelf to complete the ex-warehousing. The warehoused goods in a storage location with a small total inventory of storage location is preferably selected, thus implementing the principle of clearing of storage location.

In this embodiment, as another optional embodiment, the method further includes:

if there are multiple storage locations with the same total inventory of storage location, sorting the positions of storage locations in an order of high to low, and instructing to preferably select warehoused goods in a storage location with a high position to be ex-warehoused.

In this embodiment, by selecting the warehoused goods in a storage location with a high position to be ex-warehoused, the balance of the goods shelf information may be maintained, and the possibility of toppling during the AGV transportation process may be reduced.

This embodiment provides an optimal ex-warehousing method for inventory: applying an automated guided vehicle capable of transporting goods to a designated position to an intelligent warehouse management system (IWMS); based on order information generated by the external enterprise resource planning (ERP) system, and combined with the inventories managed by IWMS, automatically screening out the goods shelf information, storage locations and inventories that meet the conditions in the order information; and notifying the AGV to handle warehoused goods from the warehouse to the operation platform.

That is, the AGV handles the warehoused goods to the manually processed interchange point for picking, such that the ex-warehousing process does not require manual handling in transporting of goods and managing of inventories. By an incorporating order process of the received order during the ex-warehousing process, the number of times of ex-warehousing is reduced, the total time of processing is reduced and the ex-warehousing efficiency is improved. Further, by determining the warehoused goods properties included in the order, automatically screening the inventories to find the optimal inventories that meet the conditions, and optimizing the ex-warehoused inventories to find an inventory most suitable ex-warehousing, under the premise of accurately managing inventories, the ex-warehousing time is effectively reduced, the number of times of handling is effectively reduced, the inventories of storage locations are effectively cleared, and the risk of goods shelf information, when being handled, toppling is effectively reduced.

Figure 2:
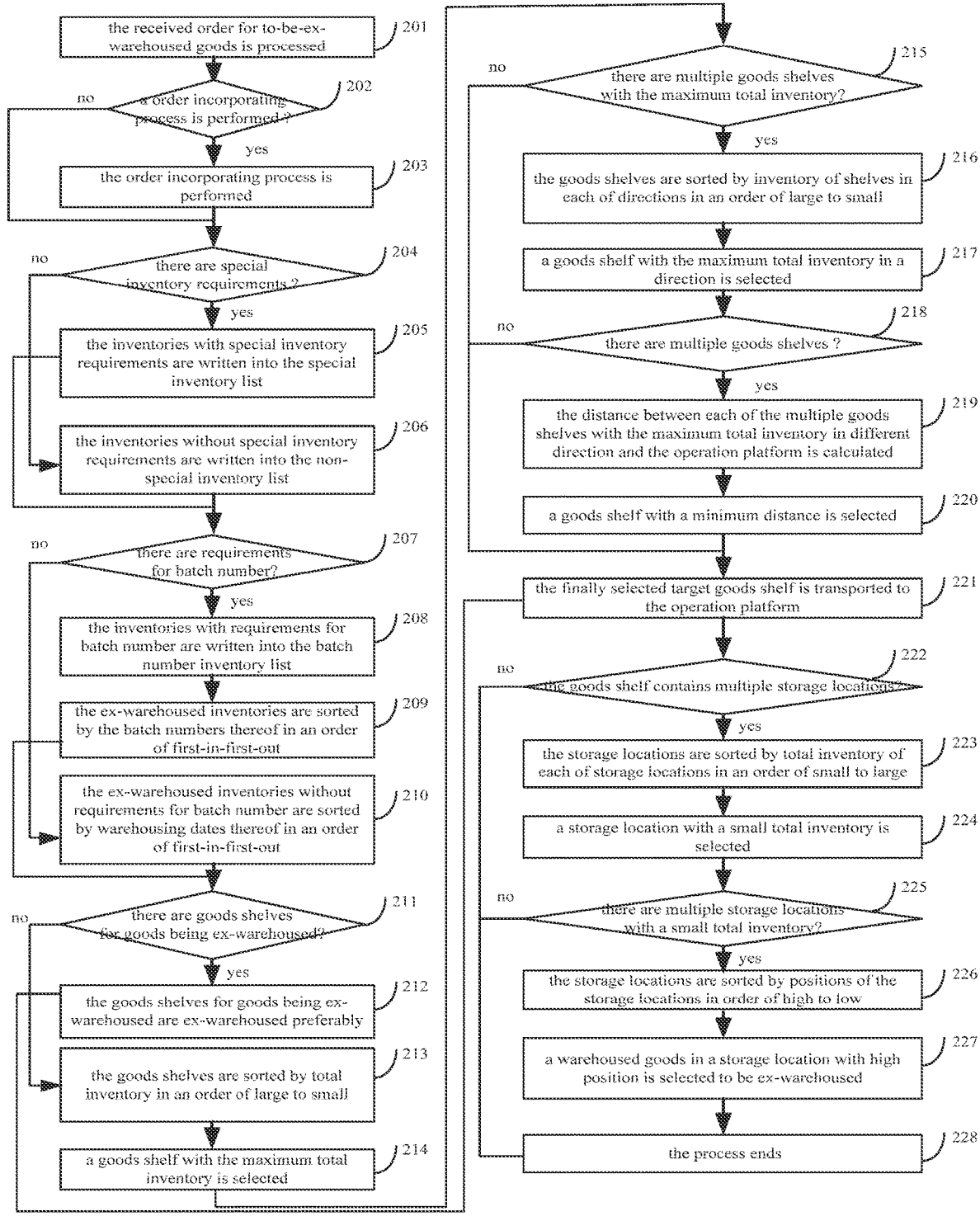
FIG. 2 is a specifically schematic flowchart of an ex-warehousing method according to a second embodiment of the present application.

FIG. 2 is a specifically schematic flowchart of an ex-warehousing method of a second embodiment of the present application. As shown in FIG. 2, the method in this embodiment may include the following steps.

In step 201, the received order for to-be-ex-warehoused goods is processed.

In this embodiment, the order for to-be-ex-warehoused goods is processed to acquire an inventory list of each of warehoused to-be-ex-warehoused goods.

In step 202, it is determined whether a order incorporating process can be performed; if yes, step 203 is performed, if no, step 204 is performed.

In step 203, the order incorporating process is performed; and step 204 is performed.

In this embodiment, each of warehoused goods properties (goods list) in the acquired inventory list is compared to determine whether there are inventories with the same goods, batch number, factory, storage location, and special inventory; if yes, the order for to-be-ex-warehoused goods is incorporated with the order for goods currently being ex-warehoused.

In step 204, it is determining whether there are special inventory requirements; if yes, step 205 is performed; if no, step 206 is performed.

In step 205, the inventories with special inventory requirements are written into the special inventory list; and step 207 is performed.

In this embodiment, it is determined whether the ex-warehoused inventories have the special inventory, if the ex-warehoused inventories have the special inventory, ex-warehoused inventories with the special inventory are screened out to form the special inventory list, if the ex-warehoused inventories do not have the special inventory, ex-warehoused inventories without the special inventory are screened out to form the non-special inventory list.

In step 206, the inventories without special inventory requirements are written into the non-special inventory list; and step 207 is performed.

In step 207, it is determining whether there are requirements for batch number; if yes, step 208 is performed; if no, step 210 is performed.

In step 208, the inventories with requirements for batch number are written into the batch number inventory list.

In step 209, the ex-warehoused inventories are sorted by the batch numbers thereof in an order of first-in-first-out; and step 211 is performed.

In step 210, the ex-warehoused inventories without requirements for batch number are sorted by warehousing dates thereof in an order of first-in-first-out.

In this embodiment, it is determined whether the ex-warehoused inventories have special batch numbers, if yes, ex-warehoused inventories with the special batch numbers are screened out, and sorted by the batch numbers thereof in an order of first-in-first-out; otherwise, the ex-warehoused inventories are screened out according to warehousing dates thereof in an order of first-in-first-out.

In step 211, it is determined in the list whether there are goods shelves for goods being ex-warehoused; if yes, step 212 is performed; if no, step 213 is performed.

In step 212, the goods shelves for goods being ex-warehoused are ex-warehoused preferably; and step 221 is performed.

In this embodiment, it is determined whether there are inventories to be ex-warehoused in a goods shelf for goods being ex-warehoused, and if yes, the inventories are preferably ex-warehoused.

In step 213, the goods shelves are sorted by total inventory in an order of large to small.

In this embodiment, if there are multiple pieces of the goods shelf information with an earlier batch number or with an earlier warehousing date, the goods shelves are sorted by total inventory, in order of large to small.

In step 214, a goods shelf with the maximum total inventory is selected.

In this embodiment, the screened inventories are sorted by total inventory of goods shelf, at which the screened inventories are located in an order of large to small, and the goods shelf information with large total inventory is preferably selected, thus implementing the principle of reducing goods shelf information.

In step 215, it is determined whether there are multiple goods shelves with the maximum total inventory; if yes, step 216 is performed; if not, step 221 is performed.

In step 216, the goods shelves are sorted by inventory of shelves in each of directions in an order of large to small.

In step 217, a goods shelf with the maximum total inventory in a direction is selected.

In this embodiment, the screened inventories are sorted by inventory of shelves in each of directions in an order of large to small, and the direction with large total inventory is preferably selected, implementing the principle of less choice of goods shelf information.

In step 218, it is determined whether there are multiple goods shelves with a maximum total inventory in different directions; if yes, step 219 is performed; if no, step 221 is performed.

In step 219, the distance between each of the multiple goods shelves with the maximum total inventory in different direction and the operation platform is calculated.

In step 220, a goods shelf with a minimum distance is selected.

In this embodiment, the distance between each of the goods shelves meeting the above conditions and the operation platform is calculated, and the goods shelf with the shortest distance is prioritized.

In step 221, the finally selected target goods shelf is transported to the operation platform.

In step 222, it is determined whether the goods shelf contains multiple storage locations; if yes, step 223 is performed; if no, step 228 is performed.

In step 223, the storage locations are sorted by total inventory of each of storage locations in an order of small to large.

In step 224, a storage location with a small total inventory is selected.

In this embodiment, the screened inventories are sorted by total inventory of each of storage locations in goods shelf information, at which the screened inventories are located, in order of large to small, and a storage location with a small total inventory is preferably selected, implementing the principle of clearing of storage location.

In step 225, it is determined whether there are multiple storage locations with a small total inventory; if yes, step 226 is performed; if no, step 228 is performed.

In step 226, the storage locations are sorted by positions of the storage locations in order of high to low.

In step 227, a warehoused goods in a storage location with high position is selected to be ex-warehoused.

In this embodiment, if the multiple storage locations have the same total inventory of storage location, a storage location with higher position is selected preferably. This principle is to maintain the balance of goods shelf information and reduce the possibility of toppling during the AGV transportation process.

In step 228, the process ends.

In this embodiment, the ex-warehousing links of the intelligent warehousing system is improved. Specifically, when ex-warehousing, compare the inventory to be ex-warehoused with the inventory being ex-warehoused; if the inventory to be ex-warehoused is the same as the inventory being ex-warehoused, the inventory to be ex-warehoused is incorporated into task for being ex-warehoused, and orders may be automatically and efficiently incorporated for the same goods. This solution may not only incorporate the orders processed at the same time, but also incorporate the different orders that have been processed one after another and have the same ex-warehoused inventory, thus effectively reducing the number of times of robot handling. The principle of ex-warehousing is designated, including the principle of reducing goods shelf information, the principle of less choice of goods shelf information, the principle of shortest distance, the principle of clearing of storage location, and the principle of high storage location priority. When no batch number is designated, the warehoused goods may be first-in-first-out based on the order in which the warehoused goods are stored in the warehouse, so that accurate first-in-first-out may be achieved. Not only can the ex-warehousing order be determined based on the batch number, but also, when the batch number is not designated, the goods can be first-in-first-out based on the order of the goods are stored in the warehouse, such that the goods shelf information and the storage location are more reasonably and efficiently managed. Not only will the goods shelf information closest to the operation platform be selected, but also reducing of goods shelf information, less choice of goods shelf information, clear of storage locations, and the lower storage location will be prioritized.

Figure 3:
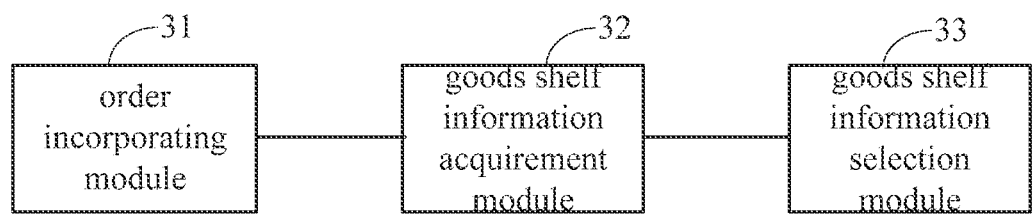
FIG. 3 is a schematic structural diagram of an ex-warehousing apparatus according to a third embodiment of the present application.

FIG. 3 is a schematic structural diagram of an ex-warehousing apparatus according to a third embodiment of the present application. As shown in FIG. 3, the apparatus in this embodiment may include an order incorporating module 31, a goods shelf information acquirement module 32 and a goods shelf information selection module 33.

The order incorporating module 31 is configured for: during an ex-warehousing process, receiving an order for to-be-ex-warehoused goods and incorporating the order for to-be-ex-warehoused goods with an order for goods currently being ex-warehoused to obtain a incorporated order.

In this embodiment, as an optional embodiment, receiving an order for to-be-ex-warehoused goods and incorporating the order for to-be-ex-warehoused goods with an order for goods currently being ex-warehoused to obtain an incorporated order includes:

traversing the properties of the warehoused goods in the order for to-be-ex-warehoused goods, and determining whether there are goods in the order for goods currently being ex-warehoused with the same properties as that of the traversed warehoused goods; if yes, updating, based on the number in an order columns corresponding to the properties of the traversed warehoused goods, the number in an order columns corresponding to the same properties of the warehoused goods in the order for goods currently being ex-warehoused; if no, adding the order columns corresponding to the properties of the traversed warehoused goods to the order for goods currently being ex-warehoused.

As another optional embodiment, receiving an order for to-be-ex-warehoused goods and incorporating the order for to-be-ex-warehoused goods with an order for goods currently being ex-warehoused to obtain an incorporated order includes:

A11, traversing the properties of the warehoused goods in the order for to-be-ex-warehoused goods, and matching respectively the properties of the warehoused goods in the order for to-be-ex-warehoused goods with the inventory list; if the matching is successful, writing order columns corresponding to the properties of the matched warehoused goods into the order for goods currently being ex-warehoused;

A12, determining, in the order for goods currently being ex-warehoused into which the properties of the matched warehoused goods are written, whether there is a good whose properties are the same as that of a matched warehoused good; if yes, updating, based on the number in order columns corresponding to the properties of the matched warehoused goods, the number in order columns corresponding to the properties of the same warehoused goods in the order for goods currently being ex-warehoused, and deleting the written order columns corresponding to the properties of the warehoused goods.

The goods shelf information acquirement module 32 is configured for: based on each of warehoused goods properties in the incorporated order, goods shelf information matching each of the warehoused goods properties is acquired respectively.

In this embodiment, as an optional embodiment, the goods shelf information acquirement module 32 includes: a first classifying unit, a second classifying unit and a goods shelf information acquirement unit (not shown in figures).

The first classifying unit is configured for classifying all warehoused goods in the incorporated order into a special inventory list and a non-special inventory list based on whether the properties of the warehoused goods include a special inventory.

The second classifying unit is configured for classifying the special inventory list and the non-special inventory list secondarily based on whether a batch number is included in properties of the warehoused goods.

The goods shelf information acquirement unit is configured for: querying a preset inventory list for acquiring goods shelf information of the secondary-classified warehoused goods, and incorporating the acquired goods shelf information.

The goods shelf information selection module 33 is configured for: matching acquired goods shelf information based on a preset goods shelf information ex-warehousing strategy, to obtain a target goods shelf information.

In this embodiment, as an optional embodiment, the goods shelf information selection module 33 includes: a first determination unit (not shown in figures). Wherein, the first determination unit is configured for: determining whether there is goods shelf information for goods being ex-warehoused, and if there is goods shelf information for goods being ex-warehoused, determining the goods shelf information for goods being ex-warehoused as the target goods shelf information In this embodiment, as another optional embodiment, the goods shelf information selection module 33 includes: a third determination unit, a second determination unit and a batch number sorting unit. Wherein, the third determination unit is configured for determining whether there is goods shelf information for goods being ex-warehoused, and if no, notifying the second determination unit;

the second determination unit is configured for determining whether the acquired goods shelf information comprises batch numbers, and if yes, notifying the batch number sorting unit;

the batch number sorting unit is configured for sorting the acquired pieces of goods shelf information comprising batch numbers by the batch numbers in an order of first-in-first-out, and selecting sequentially the pieces of goods shelf information sorted by the batch numbers as the target goods shelf information.

In this embodiment, as further optional embodiment, the goods shelf information selection module 33 further includes: a date sorting unit. Wherein, the second determination unit is further configured for, if the acquired goods shelf information does not comprises a batch number, notifying the date sorting unit;

the date sorting unit is configured for sorting the acquired pieces of goods shelf information that do not comprises a batch number by warehousing dates in an order of first-in-first-out, and selecting sequentially the pieces of goods shelf information sorted by the warehousing dates as the target goods shelf information.

In this embodiment, as an optional embodiment, the date sorting unit is further configured for:

if there are multiple pieces of goods shelf information for a warehousing date, sorting the multiple pieces of the goods shelf information with the warehousing date by total inventory of the goods shelf information in an order of large to small, and selecting sequentially the pieces of goods shelf information sorted by the total inventory as the target goods shelf information.

In this embodiment, as an optional embodiment, the batch number sorting unit is further configured for: if there are multiple pieces of goods shelf information for a batch number, sorting the multiple pieces of the goods shelf information with the batch number by total inventory of the goods shelf information in an order of large to small, and selecting sequentially the pieces of goods shelf information sorted by the total inventory as the target goods shelf information.

In this embodiment, as another optional embodiment, the batch number sorting unit is further configured for: if there are multiple pieces of goods shelf information each of which has the same total inventory in the sorting by the total inventory, sorting the multiple pieces of goods shelf information by inventory of the goods shelf information in each of directions in order of large to small, and selecting sequentially the pieces of goods shelf information sorted by the inventory in the directions as the target goods shelf information.

In this embodiment, as further optional embodiment, the batch number sorting unit is further configured for: if there are multiple pieces of goods shelf information with the same total inventory in different directions in the sorting by directions, calculating distances between each of the multiple pieces of goods shelf information with the same total inventory in different directions and a operation platform, sorting the multiple pieces of goods shelf information by the distances in an order of near to far, and selecting sequentially the pieces of goods shelf information sorted by the distances as the target goods shelf information.

As an optional embodiment, the date sorting unit is further configured for: if there are multiple pieces of goods shelf information for a warehousing date, sorting the multiple pieces of the goods shelf information with the warehousing date by total inventory of the goods shelf information in an order of large to small.

In this embodiment, as another optional embodiment, the date sorting unit is further configured for: if there are multiple pieces of goods shelf information each of which has the same total inventory in the sorting by the total inventory, sorting the multiple pieces of goods shelf information by inventory of the goods shelf information in each of directions in order of large to small.

In this embodiment, as further optional embodiment, the date sorting unit is further configured for: if there are multiple pieces of goods shelf information with the same total inventory in different directions in the sorting by directions, calculating distances between each of the multiple pieces of goods shelf information with the same total inventory in different directions and a operation platform, sorting the multiple pieces of goods shelf information by the distances in an order of near to far.

In this embodiment, as an optional embodiment, the apparatus further includes:

an instructing module (not shown in figures), configured for: instructing an automated guided vehicle to transport the target goods shelf corresponding to the target shelf information to a operation platform based on the target goods shelf information.

In this embodiment, as an optional embodiment, the apparatus further includes:

an ex-warehousing module (not shown in figures), configured for, in an order of small to large for the total inventory at each of storage locations in the target goods shelf information, instructing to preferably select warehoused goods in a storage location with a small total inventory at a storage location to be ex-warehoused.

In this embodiment, as an optional embodiment, the ex-warehousing module is further configured for, if there are multiple storage locations with the same total inventory, arranging, in an order of high to low for positions of storage locations, instructing to preferably select warehoused goods at a storage location with a high position to be ex-warehoused.

The apparatus in this embodiment may be configured for implementing the technical solutions of embodiments of method shown in FIG. 1 and FIG. 2. The implementation principles and technical effects are similar, and will not be repeated herein.

It should be noted that the relationship terms used herein, such as "first", "second" and the like are only configured for distinguishing one entity or operation from another entity or operation, but do not necessarily require or imply that there is an actual relationship or order between these entities or operations. Moreover, the terms "include", "comprise", or any variants thereof are intended to cover a non-exclusive inclusion, such that processes, methods, articles, or devices, including a series of elements, include not only those elements that have been listed, but also other elements that are not specifically listed or the elements intrinsic to these processes, methods, articles, or devices. Without further limitations, elements defined by the wording "include(s) a/an . . . ", "comprise(s) a/an . . . " do not exclude additional identical elements in the processes, methods, articles, or devices including the listed elements.

All of the embodiments in the description are described in a correlated manner, and identical or similar parts in various embodiments can refer to one another. In addition, the description for each embodiment focuses on the differences from other embodiments.

In particular, the embodiment of the equipment is described briefly, since it is substantially similar to the embodiment of the method, and the related contents can refer to the description of the embodiment of the method.

The logic and/or steps represented in the flowchart or otherwise described herein, for example, which may be considered as an ordered list of executable instructions for implementing logical functions, may be embodied in any computer readable medium, for use by, or in conjunction with, instruction execution systems, devices, or devices (for example, a computer-based system, a system including a processor, or other system that may extract instructions from an instruction execution system, device or equipment and execute the instructions). In terms of this specification, a "computer-readable medium" may be any devices that may include, store, communicate, propagate, or transmit a program for use by or in conjunction with the instruction execution systems, devices, or devices. More specific examples (non-exhaustive list) of computer readable medium include: an electrical connection (an electronic device) having one or more wires, a portable computer disk cartridge (a magnetic device), a random access memory (RAM), a read only memory (ROM), an erasable editable read only memory (EPROM or a flash memory), a fiber optic devices, and a portable compact disk read only memory (CDROM). In addition, the computer readable medium may even be papers or other suitable mediums on which the program may be printed. The program is obtained electronically, for example, by optical scanning of papers or other mediums, followed editing, interpreting or, if necessary, processing in other suitable manner, and then is stored it in a computer memory.

It should be understood that each of portions of the present application may be implemented in hardware, software, firmware, or a combination thereof.

In the above-described implement manner, multiple steps or methods may be implemented in software or firmware stored in a memory and executed by a suitable instruction execution system. For example, if they are implemented in hardware, as in another embodiment, they may be implemented by any one of the following techniques well known in the art or combination thereof: a discrete logic circuit having logic gate circuits for implementing logic functions on data signals, an application specific integrated circuit having suitable combinational logic gate circuits, a programmable gate array (PGA), a field programmable gate array (FPGA), etc.

An embodiment of the present application further provides an electronic device, includes the device in the device-described anyone embodiment.

Figure 4:
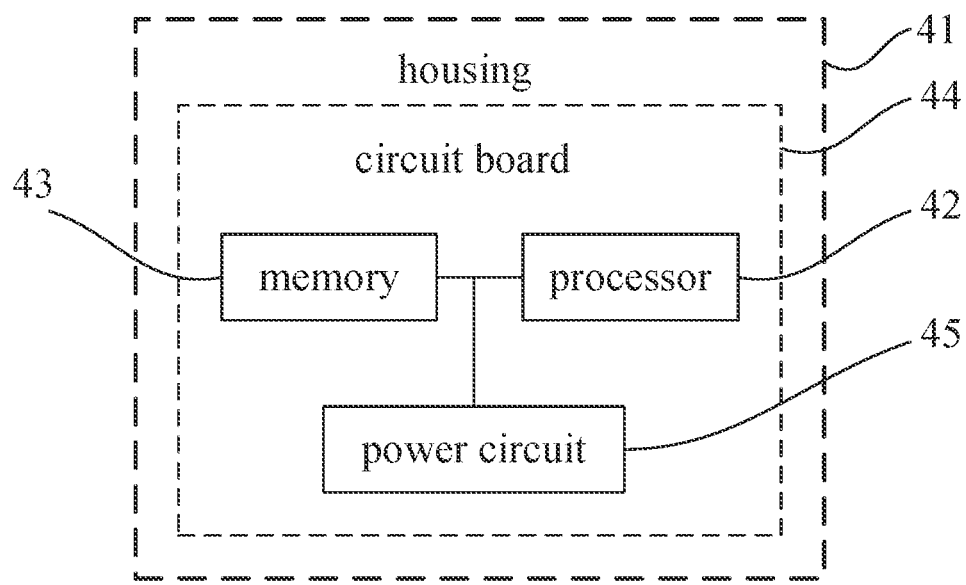
FIG. 4 is a schematic structural diagram of an embodiment of an electronic device of the present application.

FIG. 4 is a schematic structural diagram of an embodiment of an electronic device of the present application, which may implement the processes of the embodiments shown in FIGS. 1-3 of the present application. As shown in FIG. 4, the above electronic device may include: a housing 41, a processor 42, a memory 43, a circuit board 44, and a power circuit 45. Wherein, the circuit board 44 is arranged inside the space surrounded by the housing 41; the processor 42 and the memory 43 are arranged on the circuit board 44; the power circuit 45 is configured for supplying power to each circuit or component of the above electronic device; the memory 43 is configured for storing an executable program code; the processor is configured for implementing the ex-warehousing method in the above-described anyone embodiment by reading the executable program code stored in the memory 43 to execute the program corresponding to the executable program code.

For the specific process of the processor 42 executing the above-described steps and the steps further executed by the processor 42 by executing the executable program code, may refer to the description of embodiments shown in FIGS. 1-3 of the present application, and will not be repeated herein.

The electronic device exists in various forms including but not limited to:

(1) mobile communication devices: this type of devices are characterized by having mobile communication functions, with primary purposes to provide voice and data communication. Such terminals include: smart phones (e.g., iPhone), multimedia phones, functional phones, low-end phones, and the like.

(2) ultra-mobile personal computer devices: this type of devices belong to the category of personal computers, has computing and processing functions, and generally also has mobile network properties. This type of terminals include: PDA, MID, UMPC (e.g., iPad) and the like.

(3) portable entertainment devices: this type of devices can display and play multimedia contents. Such devices include: audio and video players (e.g., iPod), Portable Game Console, ebooks, and smart toys and portable onboard navigation devices.

(4) servers which are devices that provide computing services, and are composed of a processor, a hard disk, a RAM, a system bus and the like. The architecture of a server is similar to that of a general computer, but because it needs to provide highly reliable services, it has relatively high requirements in terms of processing capacity, stability, reliability, security, expandability, manageability and the like.

(5) other electronic devices that have a data interaction function.

It could be understood by those with ordinary skills in the technical art that the implementation of all or a part of the steps of the methods of embodiment described above may be accomplished by a program instructing related hardware, and the program may be stored in a computer-readable storage medium. When the program is executed, one or a combination of the steps of the embodiment of method is implemented.

Figure 5:
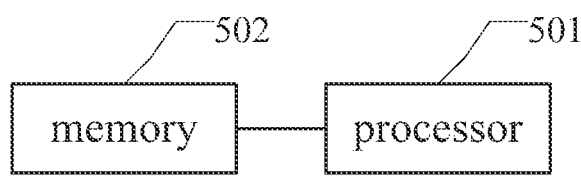
FIG. 5 is a schematic structural diagram of another embodiment of an electronic device of the present application.

An embodiment of the present application provides an electronic device. As shown in FIG. 5, the electronic device may include: a processor 501 and a memory 502. Wherein, the memory 502 is configured for storing executable program code, and the processor 502 is configured for implementing any one of the above-described ex-warehousing methods by reading the executable program code stored in the memory 502 to execute the program corresponding to the executable program code.

An embodiment of the present application further provides an executable program code, and the executable program code is configured for: when being executed, implementing any one of the above-described ex-warehousing methods.

An embodiment of the present application further provides a computer readable storage medium for storing executable program code; and the executable program code is configured for: when being executed, implementing any one of the above-described ex-warehousing methods.

In the embodiment of the present application, an order for to-be-ex-warehoused goods is received during an ex-warehousing process, the order for to-be-ex-warehoused goods is incorporated with an order for goods currently being ex-warehoused to obtain a incorporated order, based on each of warehoused goods properties in the incorporated order, goods shelf information matching each of the warehoused goods properties is acquired respectively; and acquired goods shelf information is matched based on a preset goods shelf information ex-warehousing strategy, to obtain a target goods shelf information. The ex-warehousing efficiency can be improved, to solve the problems of the increased number of times of ex-warehousing, the extended total time of processing and thus the reduced ex-warehousing efficiency, due to the new orders are not processed during the ex-warehousing of goods, in the existing ex-warehousing method.

For the convenience of description, the above device is described by respectively describing individual units/modules divided in the form of functions. Of course, the functions of the individual units/modules may be implemented in one or more software and/or hardware when implementing the present application.

From the above description of the implement manners, those skilled in the art may clearly understand that the present application may be implemented by means of software and the necessary universal hardware platform. Based on such understanding, the technical solution of the present application essentially or the portion thereof contributing to the prior art may be embodied in the form of a software product. The computer software product may be stored in a storage medium, such as a ROM/RAM, a magnetic disk, an optical disk, or the like, and includes several instructions such that a computer device (may be a personal computer, a server, or a network equipment, etc.) implements the methods described in various embodiments or certain portions of the embodiments of the present application.

It should be noted that the relationship terms used herein, such as "first", "second" and the like are only configured for distinguishing one entity or operation from another entity or operation, but do not necessarily require or imply that there is an actual relationship or order between these entities or operations. Moreover, the terms "include", "comprise", or any variants thereof are intended to cover a non-exclusive inclusion, such that processes, methods, articles, or equipment, including a series of elements, include not only those elements that have been listed, but also other elements that are not specifically listed or the elements intrinsic to these processes, methods, articles, or equipment. Without further limitations, elements defined by the wording "include(s) a/an . . . ", "comprise(s) a/an . . . " do not exclude additional identical elements in the processes, methods, articles, or equipment including the listed elements.

All of the embodiments in the description are described in a correlated manner, and identical or similar parts in various embodiments can refer to one another. In addition, the description for each embodiment focuses on the differences from other embodiments. In particular, the embodiment of the ex-warehousing apparatus shown in FIG. 3, the embodiments of the electronic device shown in FIG. 4 and FIG. 5, the embodiment of the above-described executable program code, the embodiment of the above-described computer readable storage medium are described briefly, since they are basically similar to the embodiments of the ex-warehousing method shown in FIGS. 1-2. And the related contents can refer to the description of the embodiments of the ex-warehousing method shown in FIGS. 1-2.

The embodiments described above are simply preferable embodiments of the present application, and are not intended to limit the scope of protection of the present application. Any modifications, alternatives, improvements, or the like within the spirit and principle of the present application shall be included within the scope of protection of the present application.

The invention claimed is:

1. An electronic device, which is applied in an Intelligent Warehouse Management System, comprising: a processor and a memory; wherein, the memory is configured for storing executable program code, and the processor is configured for executing a program corresponding to the executable program code by reading the executable program code stored in the memory, the executable program code comprising instructions for:

receiving an order for to-be-ex-warehoused goods during an ex-warehousing process, wherein, in the ex-warehousing process, goods shelf information, storage locations and inventories that meet the conditions in an order information are automatically screened out according to an order for goods currently being ex-warehoused, an automated guided vehicle is notified to transport warehoused goods from the warehouse to an operation platform and the automated guided vehicle transports the warehoused goods to an interchange point for picking;

incorporating the order for to-be-ex-warehoused goods with the order for goods currently being ex-warehoused to obtain an incorporated order;

acquiring, based on properties of warehoused goods in the incorporated order, goods shelf information matching with the properties of the warehoused goods respectively if the incorporated order has not been matched with an inventory list;

obtaining target goods shelf information according to the matched goods shelf information acquired based on a preset goods shelf information ex-warehousing strategy; and instructing the automated guided vehicle such that the automated guided vehicle transports the target goods shelf corresponding to the target shelf information to an operation platform where the goods are unloaded from the target goods shelf to complete the ex-warehousing, wherein, the executable program code further comprises instructions for:

if there are multiple pieces of goods shelf information each of which has the same total inventory, sorting the multiple pieces of goods shelf information by inventory of the goods shelf information in each of directions in order of large to small, and selecting sequentially the pieces of goods shelf information sorted by the inventory in the directions as the target goods shelf information, wherein, for multiple pieces of goods shelf information each of which has the same total inventory, selecting goods shelf information with a direction directed to a large total inventory in order to implement a principle of less rotation of the goods shelf, and wherein the warehoused goods is ex-warehoused from any one or more of directions of the target goods shelf;

wherein, the executable program code further comprises instructions for:

if there are multiple pieces of goods shelf information with the same total inventory in different directions in the sorting by directions, calculating distances between each of goods shelves corresponding to the multiple pieces of goods shelf information with the same total inventory in different directions and an operation platform, sorting the multiple pieces of goods shelf information by the distances in an order of near to far, and selecting sequentially the pieces of goods shelf information sorted by the distances as the target goods shelf information.

2. The electronic device of claim 1, wherein, obtaining target goods shelf information according to the matched goods shelf information acquired based on a preset goods shelf information ex-warehousing strategy, and wherein the executable program code further comprises instructions for:

determining whether there is a goods shelf being ex-warehoused, and if yes, determining the goods shelf information corresponding to the goods shelf being ex-warehoused as the target goods shelf information.

3. The electronic device of claim 1, wherein, obtaining target goods shelf information according to the matched goods shelf information acquired based on a preset goods shelf information ex-warehousing strategy, and wherein the executable program code further comprises instructions for:

determining whether there is a goods shelf being ex-warehoused, if no, then determining if the acquired goods shelf information comprises batch numbers, and if yes, then sorting the acquired pieces of goods shelf information comprising batch numbers by the batch numbers in an order of first-in-first-out, and selecting sequentially the pieces of goods shelf information sorted by the batch numbers as the target goods shelf information.

4. The electronic device of claim 3, wherein, the executable program code further comprises instructions for:

if there are multiple pieces of goods shelf information for a batch number, sorting the multiple pieces of the goods shelf information with the batch number by total inventory of the goods shelf information in an order of large to small, and selecting sequentially the pieces of goods shelf information sorted by the total inventory as the target goods shelf information.

5. The electronic device of claim 1, wherein, the executable program code further comprises instructions for:

determining whether there is a goods shelf being ex-warehoused, if no, then determining if the acquired goods shelf information does not comprise batch numbers, and if yes, then sorting the acquired pieces of goods shelf information that do not comprises a batch number by warehousing dates in an order of first-in-first-out, and selecting sequentially the pieces of goods shelf information sorted by the warehousing dates as the target goods shelf information, wherein, the executable program code further comprises:

if there are multiple pieces of goods shelf information for a warehousing date, sorting the multiple pieces of the goods shelf information with the earlier warehousing date by total inventory of the goods shelf information in order of large to small, and selecting sequentially the pieces of goods shelf information sorted by the total inventory as the target goods shelf information.

6. The electronic device of claim 1, wherein, the executable program code further comprises instructions for:

determining if the goods shelf contains multiple storage locations, and if so, the storage locations are sorted by total inventory of each of the storage locations in an order of small to large, and instructing to select warehoused goods in a storage location with a small total inventory at a storage location to be ex-warehoused, wherein, the executable program code further comprises instructions for:

if there are multiple storage locations with the same total inventory, arranging, in an order of high to low for positions of storage locations, instructing to preferably select warehoused goods at a storage location with a high position to be ex-warehoused.

7. The electronic device of claim 1, wherein, acquiring, based on properties of warehoused goods in the incorporated order, goods shelf information matching with the properties of the warehoused goods respectively, and wherein the executable program code further comprises:

classifying, based on whether a special inventory is comprised in the properties of the warehoused goods, all warehoused goods in the incorporated order into a special inventory list and a non-special inventory list;

classifying the special inventory list and the non-special inventory list secondarily, based on whether a batch number is comprised in the properties of the warehoused goods;

querying a preset inventory list to acquire goods shelf information to which each of the secondary-classified warehoused goods belongs, and incorporating the acquired goods shelf information.

8. An ex-warehousing apparatus, which is applied in an Intelligent Warehouse Management System, comprising: an order incorporating module, a goods shelf information acquirement module and a goods shelf information selection module; wherein, the order incorporating module is configured for: during an ex-warehousing process, receiving an order for to-be-ex-warehoused goods and incorporating the order for to-be-ex-warehoused goods with an order for goods currently being ex-warehoused to obtain an incorporated order, wherein, in the ex-warehousing process, goods shelf information, storage locations and inventories that meet the conditions in an order information are automatically screened out according to an order for goods currently being ex-warehoused, an automated guided vehicle is notified to transport warehoused goods from the warehouse to an operation platform and the automated guided vehicle transports the warehoused goods to an interchange point for picking;

the goods shelf information acquirement module is configured for: acquiring, based on properties of warehoused goods in the incorporated order, goods shelf information matching with the properties of the warehoused goods respectively if the incorporated order has not been matched with an inventory list;

the goods shelf information selection module is configured for: obtaining target goods shelf information according to the matched goods shelf information acquired based on a preset goods shelf information ex-warehousing strategy; and an instructing module, configured for instructing the automated guided vehicle such that the automated guided vehicle transports the target goods shelf corresponding to the target shelf information to an operation platform where the goods are unloaded from the target goods shelf to complete the ex-warehousing, wherein, the goods shelf information selection module is further configured for:

if there are multiple pieces of goods shelf information each of which has the same total inventory, sorting the multiple pieces of goods shelf information by inventory of the goods shelf information in each of directions in order of large to small, and selecting sequentially the pieces of goods shelf information sorted by the inventory in the directions as the target goods shelf information, wherein, for multiple pieces of goods shelf information each of which has the same total inventory, selecting goods shelf information with a direction directed to a large total inventory in order to implement a principle of less rotation of the goods shelf, and wherein the warehoused goods is ex-warehoused from any one or more of directions of the target goods shelf, wherein, the goods shelf information selection module is further configured for:

if there are multiple pieces of goods shelf information with the same total inventory in different directions in the sorting by directions, calculating distances between each of goods shelves corresponding to the multiple pieces of goods shelf information with the same total inventory in different directions and the operation platform, sorting the multiple pieces of goods shelf information by the distances in an order of near to far, and selecting sequentially the pieces of goods shelf information sorted by the distances as the target goods shelf information.

9. The ex-warehousing apparatus of claim 8, wherein, the goods shelf information selection module comprises: a first determination unit; wherein, the first determination unit is configured for: determining whether there is a goods shelf being ex-warehoused, and if yes, determining the goods shelf information corresponding to the goods shelf being ex-warehoused as the target goods shelf information.

10. The ex-warehousing apparatus of claim 8, wherein, the goods shelf information selection module comprises: a third determination unit, a second determination unit and a batch number sorting unit; wherein, the third determination unit is configured for determining whether there is a goods shelf being ex-warehoused, and if no, notifying the second determination unit;

the second determination unit is configured for determining whether the acquired goods shelf information comprises batch numbers, and if yes, notifying the batch number sorting unit;

the batch number sorting unit is configured for sorting the acquired pieces of goods shelf information comprising batch numbers by the batch numbers in an order of first-in-first-out, and selecting sequentially the pieces of goods shelf information sorted by the batch numbers as the target goods shelf information.

11. The ex-warehousing apparatus of claim 10, wherein, the batch number sorting unit is further configured for:

if there are multiple pieces of goods shelf information for a batch number, sorting the multiple pieces of the goods shelf information with the batch number by total inventory of the goods shelf information in an order of large to small, and selecting sequentially the pieces of goods shelf information sorted by the total inventory as the target goods shelf information.

12. The ex-warehousing apparatus of claim 8, wherein, the goods shelf information selection module comprises: a third determination unit, a second determination unit and a date sorting unit; wherein, the third determination unit is configured for determining whether there is a goods shelf being ex-warehoused, and if no, notifying the second determination unit;

the second determination unit is configured for, determining if the acquired goods shelf information does not comprise batch numbers, and if yes, then notifying the date sorting unit;

the date sorting unit is configured for sorting the acquired pieces of goods shelf information that do not comprises a batch number by warehousing dates in an order of first-in-first-out, and selecting sequentially the pieces of goods shelf information sorted by the warehousing dates as the target goods shelf information, wherein, the date sorting unit is further configured for:

if there are multiple pieces of goods shelf information for a warehousing date, sorting the multiple pieces of the goods shelf information with the warehousing date by total inventory of the goods shelf information in an order of large to small, and selecting sequentially the pieces of goods shelf information sorted by the total inventory as the target goods shelf information.

13. The ex-warehousing apparatus of claim 8, wherein, the apparatus further comprises:

an ex-warehousing module, configured for, determining if the goods shelf contains multiple storage locations, and if so, the storage locations are sorted by total inventory of each of the storage locations in an order of small to large, and for instructing to select warehoused goods in a storage location with a small total inventory at a storage location to be ex-warehoused, wherein, the ex-warehousing module is further configured for, if there are multiple storage locations with the same total inventory, arranging, in an order of high to low for positions of storage locations, instructing to preferably select warehoused goods at a storage location with a high position to be ex-warehoused.

14. The ex-warehousing apparatus of claim 8, wherein, the goods shelf information acquirement module comprises: a first classifying unit, a second classifying unit and a goods shelf information acquirement unit; wherein, the first classifying unit is configured for classifying, based on whether a special inventory is comprised in the properties of the warehoused goods, all warehoused goods in the incorporated order into a special inventory list and a non-special inventory list;

the second classifying unit is configured for classifying the special inventory list and the non-special inventory list secondarily, based on whether a batch number is comprised in the properties of the warehoused goods;

the goods shelf information acquirement unit is configured for querying a preset inventory list to acquire goods shelf information to which each of the secondary-classified warehoused goods belongs, and incorporating the acquired goods shelf information.

15. A non-transitory computer readable storage medium, which is applied in an Intelligent Warehouse Management System, configured for storing executable program codes; wherein, the executable program codes are configured for, when being executed to perform a method, comprising:

receiving an order for to-be-ex-warehoused goods during an ex-warehousing process, wherein, in the ex-warehousing process, goods shelf information, storage locations and inventories that meet the conditions in an order information are automatically screened out according to an order for goods currently being ex-warehoused, an automated guided vehicle is notified to transport warehoused goods from the warehouse to an operation platform and the automated guided vehicle transports the warehoused goods to an interchange point for picking;

incorporating the order for to-be-ex-warehoused goods with the order for goods currently being ex-warehoused to obtain an incorporated order;

acquiring, based on properties of warehoused goods in the incorporated order, goods shelf information matching with the properties of the warehoused goods respectively if the incorporated order has not been matched with an inventory list;

obtaining target goods shelf information according to the matched goods shelf information acquired based on a preset goods shelf information ex-warehousing strategy; and instructing the automated guided vehicle such that the automated guided vehicle transports the target goods shelf corresponding to the target shelf information to an operation platform where the goods are unloaded from the target goods shelf to complete the ex-warehousing, wherein, the executable program code further comprises instructions for:

if there are multiple pieces of goods shelf information each of which has the same total inventory, sorting the multiple pieces of goods shelf information by inventory of the goods shelf information in each of directions in order of large to small, and selecting sequentially the pieces of goods shelf information sorted by the inventory in the directions as the target goods shelf information, wherein, for multiple pieces of goods shelf information each of which has the same total inventory, selecting goods shelf information with a direction directed to a large total inventory in order to implement a principle of less rotation of the goods shelf, and wherein the warehoused goods is ex-warehoused from any one or more of directions of the target goods shelf;

wherein, the executable program code further comprises instructions for:

if there are multiple pieces of goods shelf information with the same total inventory in different directions in the sorting by directions, calculating distances between each of goods shelves corresponding to the multiple pieces of goods shelf information with the same total inventory in different directions and an operation platform, sorting the multiple pieces of goods shelf information by the distances in an order of near to far, and selecting sequentially the pieces of goods shelf information sorted by the distances as the target goods shelf information.

* * * * *